S. H. GARST.
ANTIFRICTION BEARING FOR FURROW OPENERS.
APPLICATION FILED JAN. 16, 1914.
1,107,777.
Patented Aug. 18, 1914.
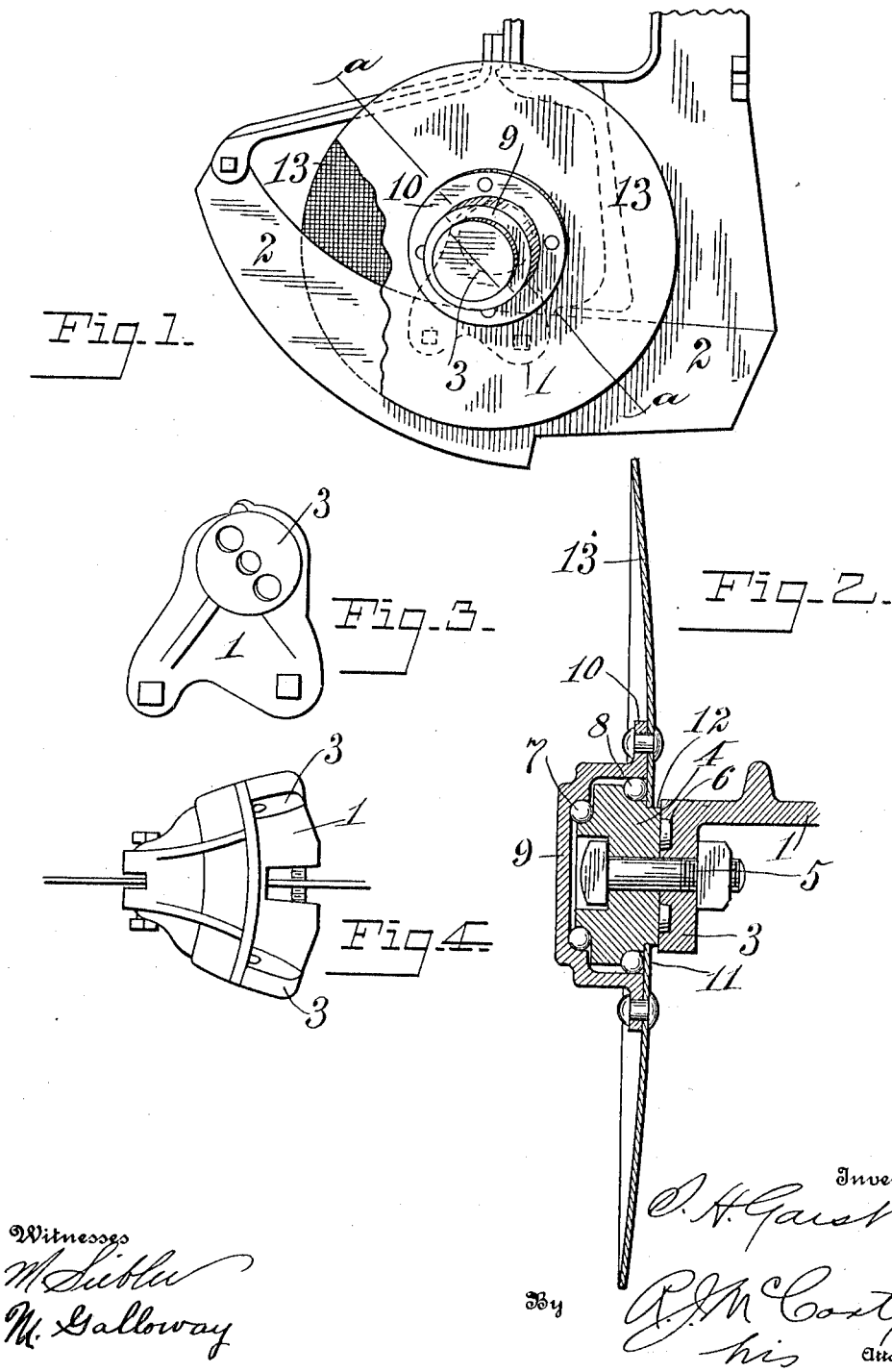

though.

UNITED STATES PATENT OFFICE.

STEPHEN H. GARST, OF MOLINE, ILLINOIS, ASSIGNOR TO D. M. SECHLER IMPLEMENT & CARRIAGE CO., OF MOLINE, ILLINOIS, A CORPORATION OF ILLINOIS.

ANTIFRICTION-BEARING FOR FURROW-OPENERS.

1,107,777.   Specification of Letters Patent.   Patented Aug. 18, 1914.

Application filed January 16, 1914. Serial No. 812,589.

*To all whom it may concern:*

Be it known that I, STEPHEN H. GARST, a citizen of the United States, residing at Moline, in the county of Rock Island and State of Illinois, have invented certain new and useful Improvements in Antifriction-Bearings for Furrow - Openers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to disk furrow openers, and more specifically to a particular form of anti-friction bearing for the disks thereof.

The object of the invention is to provide a type of anti-friction bearing which is simple and efficient and which possesses the advantageous features hereinafter described and claimed.

In the accompanying drawings which illustrate my improvements, Figure 1 is a side elevation of a planter runner equipped with my improvements; Fig. 2 is a sectional view on the line a—a of Fig. 1; Figs. 3 and 4 are a side elevation and top plan view respectively of the casting constituting the support for the disks.

For the purposes of my invention I employ a specially constructed casting 1 which is supported upon the runner 2 in a well known manner and in turn supports the bearing for the disks 13. The special feature of said casting comprises two ears 3 to each one of which a ball cone 4 is attached by the single bolt 5. As is clearly shown in Fig. 2, the bearing cone is recessed at its axis to receive the head of the bolt and on its inner side is provided with lugs 6 which enter corresponding cavities in the ear 3 and together with the bolt the said bearing 4 is held firmly in position. Inner and outer ball races are provided in the periphery of said bearing for the reception of two sets of balls 7 and 8. These balls are confined by a cap 9 which fits over the cone 4 and provides an absolute dust proof protection for the bearing. The cap 9 has an annular marginal flange 10 by means of which it is united to the disk 13. From Fig. 2, it will be seen that the inner margin 11 of the disk surrounding the axial opening therein extends inwardly and incloses the inner set of ball bearings 8, and abuts against an annular shoulder 12 formed on the bearing 4. It will, therefore, be seen that the structural features just described in connection with the disk form a portion of the ball-confining devices of the bearing and in addition thereto exclude dust or dirt from entering the inside of the bearings. A further advantage in the manner of attaching the disks lies in the securing of each disk by a single bolt which, while constituting a simple and efficient fastening for the disk, is readily accessible.

From the foregoing description and the drawings, it will be apparent that the manner of mounting the disks enables the employment of a short axle of large diameter, to-wit, the bearing cone 4. The advantages of this are obvious, for example, it dispenses with the necessity of employing a long projecting axle which would interfere with the successful operation of the machine, if, indeed, it were possible to use such form of axle. Moreover, the inclosing cap 9 being exposed to constant contact with both dirt and dust affords complete protection to the bearings because of its being free from openings. The whole bearing is riveted together so that it cannot come apart under the severest usage and is proof against the most careless handler.

Having described my invention, I claim.

In an anti-friction bearing for furrow openers, the combination with a supporting member, of a bearing member united to said supporting member and having inwardly and outwardly lying peripheral grooves provided with balls, and an annular shoulder extending inwardly from the outermost series of balls, a cap inclosing said bearing and having an outwardly disposed marginal flange, and a disk secured to said marginal flange and engaging the annular shoulder of the bearing member, the portion of said disk extending to said shoulder forming the inner closure for the outermost series of balls, substantially as specified.

In testimony whereof I affix my signature, in presence of two witnesses.

STEPHEN H. GARST.

Witnesses:
 E. E. ENGLUND,
 SHERMAN C. HARTSACK.

Copies of this patent may be obtained for five cents each, by addressing the "Commissioner of Patents, Washington, D. C."